United States Patent

[11] 3,598,030

| [72] | Inventor | David E. Beach<br>Penfield, N.Y. |
|---|---|---|
| [21] | Appl. No. | 861,942 |
| [22] | Filed | Sept. 29, 1969 |
| [45] | Patented | Aug. 10, 1971 |
| [73] | Assignee | Eastman Kodak Company<br>Rochester, N.Y. |

[54] ELECTRIC GENERATOR DRIVE MECHANISM
4 Claims, 5 Drawing Figs.

[52] U.S. Cl. .................................................. 95/10 C,
95/11 R, 95/11.5 R, 95/64 R, 240/1.3, 240/10.6 CH
[51] Int. Cl. ..................................................... G03b 7/12,
G03b 15/03
[50] Field of Search ........................................... 95/10 C, 11 R, 11.5 R, 64 R; 240/1.3, 10.6 CH

[56] References Cited
UNITED STATES PATENTS

| 2,322,067 | 6/1943 | Soreny | 95/11.5 |
| 2,490,225 | 12/1949 | McGall | 95/11.5 |
| 2,542,164 | 2/1951 | Tatro | 95/11.5 |
| 2,976,398 | 3/1961 | McKee et al. | 240/1.3 |
| 3,013,198 | 12/1961 | Witte et al. | 240/10.6 CH X |
| 3,211,069 | 10/1965 | Rixton | 95/11.5 |
| 3,485,152 | 12/1969 | Fuwa | 95/10 C |

*Primary Examiner*—Samuel S. Matthews
*Assistant Examiner*—Joseph F. Peters, Jr.
*Attorneys*—Robert W. Hampton and Milton S. Sales

ABSTRACT: Devices for driving the rotor of an electric generator which include spring-biased members drivingly connected to the generator rotor and movable between a first, "cocked" position and a second position to drive the generator. The output of the generator may supply power to a camera flashlamp circuit or an exposure control mechanism. A reset mechanism is provided to return the generator-driving member to its first, "cocked" position against the spring bias. After being set in motion, the generator rotor may continue to move independent of the driving member.

DAVID E. BEACH
INVENTOR.

BY Milton S. Sales

Robert W Hampton

ATTORNEYS

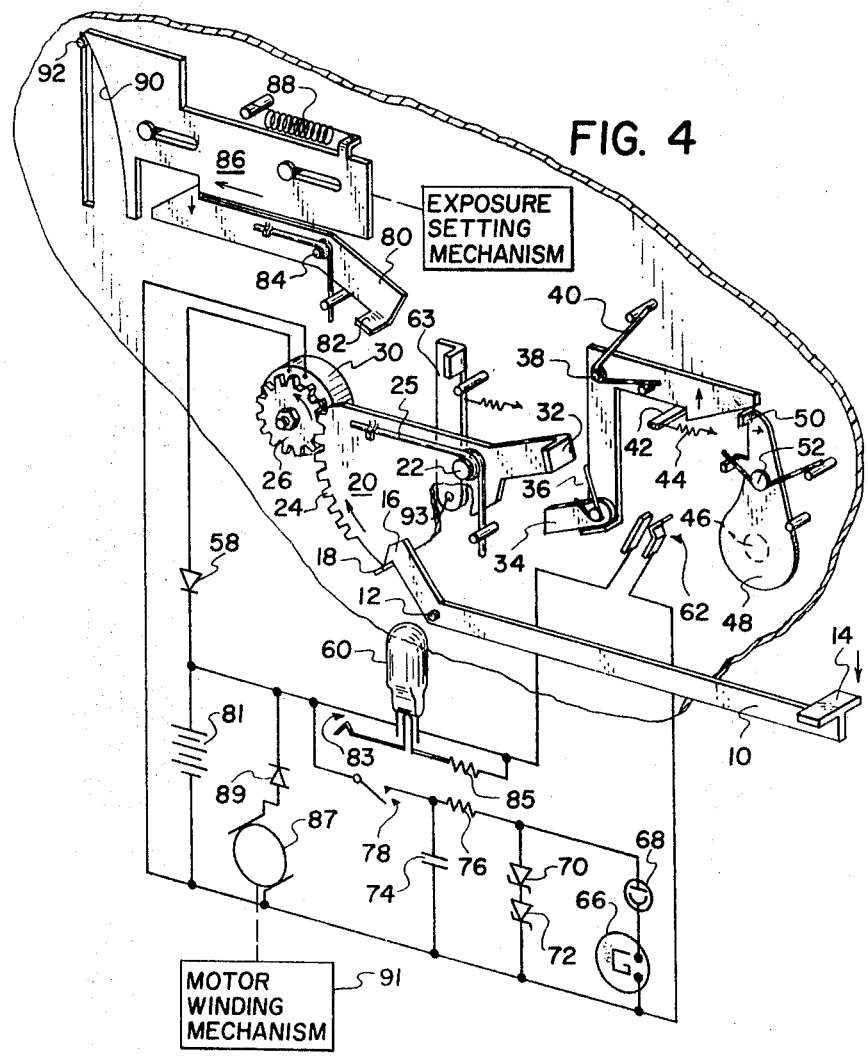

3,598,030

ELECTRIC GENERATOR DRIVE MECHANISM

CROSS-REFERENCE TO RELATED APPLICATION

Reference is made to my commonly assigned copending U.S. Pat. application Ser. No. 861,916, entitled ELECTRIC GENERATOR DRIVE MECHANISM, filed concurrently herewith.

BACKGROUND OF THE INVENTION

1. Field of the Invention

This invention relates to drive mechanisms for electric generators and is particularly but not exclusively suited for use with generators of the type used in photographic apparatus such as cameras.

2. Description of the Prior Art

Photographic apparatus such as cameras that employ electric generators are known in the art. Such apparatus commonly employ a spring-driven member to rapidly rotate the generator armature, the spring being conditioned by mechanisms in the cameras such as the film-advancing linkage or a manually operated crank. Once conditioned in this manner, the mechanism is set in motion by releasing a latch which causes the armature-driving member to move rapidly under the driving force of the spring. After the generator is supplied sufficient power, the camera shutter is automatically released. Such devices are shown in U.S. Pat. No. 2,322,067 to Ernest V. Sorney entitled FLASHLIGHT SYNCHRONIZING DEVICE and published German application No. 1,149,607 to Hans Wiener et al. The present invention is an improvement on such devices.

SUMMARY OF THE INVENTION

It is an object of the present invention to provide an improved spring-biased mechanism for driving an electric generator and setting an exposure control system. It is another object of the present invention to provide a generator drive mechanism having an improved reset mechanism for conditioning the mechanism to drive the generator. Still another object of the present invention is to provide a generator drive mechanism which permits the generator to continue to produce electrical energy after the drive mechanism has come to a rest. A further object of the present invention is to provide a camera having a battery which is rechargeable by a generator within the camera housing.

In accordance with a preferred embodiment of the invention, a movably mounted generator drive sector or member carries gear teeth which mesh with a pinion fixed to a generator armature and is movable to a position in which the teeth no longer mesh. The drive member may be latched in a first position and when unlatched moves through a path to drive the generator. The movement of the drive member may cause the closing of a switch in the flashlamp circuit or the setting of an exposure control mechanism before tripping the shutter drive mechanism. The generator drive member is reset to its first position by a lever arranged to require a constant torque input over the member's travel. The generator output may charge either a capacitor or a rechargeable battery.

The invention, and its objects and advantages will become more apparent in the detailed description of the preferred embodiments described below.

BRIEF DESCRIPTION OF THE DRAWING

In the detailed description of the preferred embodiments of the invention presented below, reference is made to the accompanying drawings, in which:

FIG. 4 is a schematic view of a second embodiment of the invention; and

FIG. 5 is a schematic view of a third embodiment of the invention.

THE PREFERRED EMBODIMENT OF THE INVENTION

Because cameras are well known, the present description will be directed in particular to elements forming part of, or cooperating more directly with, the present invention. Camera elements not specifically shown or described may take various forms well known to those skilled in the art.

Figure 1:
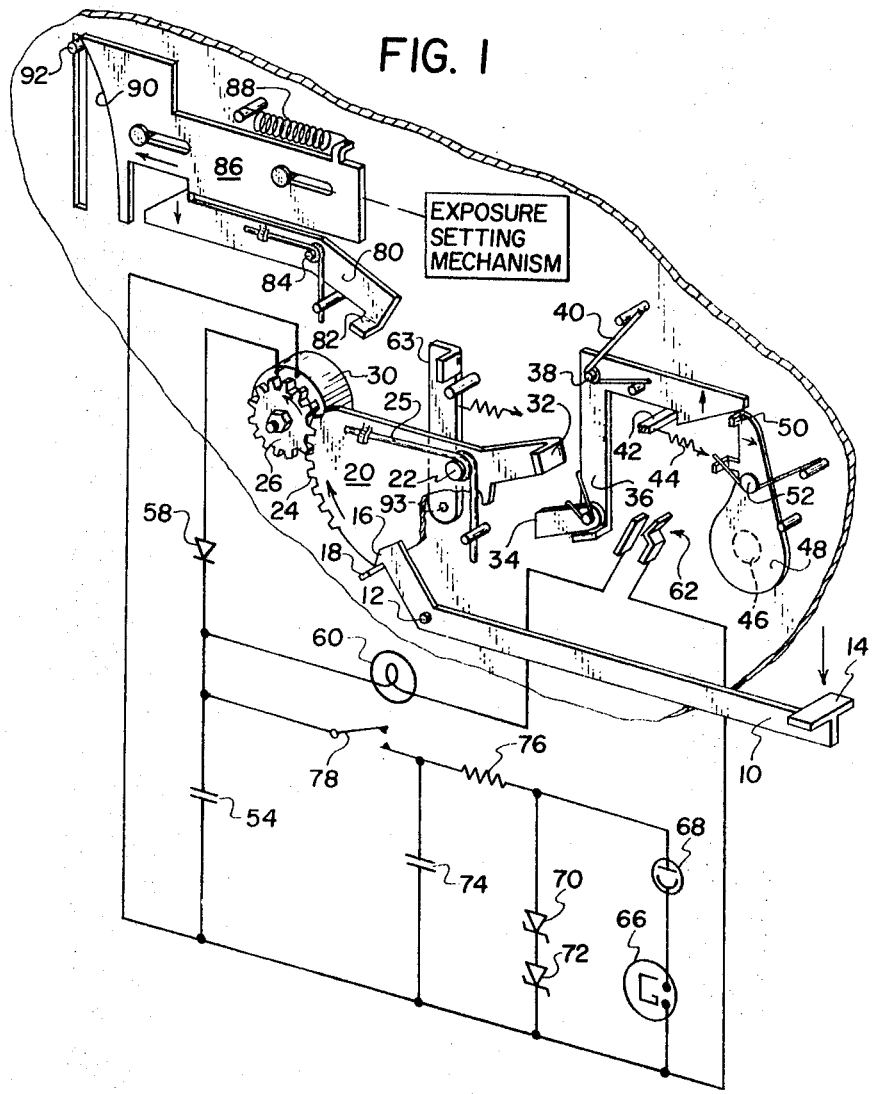
FIG. 1 is a schematic view of one embodiment of the present invention.

Referring to FIG. 1, there is shown a camera flash system in which the electrical power to ignite the flashlamp is supplied by a generator which is driven by a mechanical linkage system associated with the shutter release mechanism.

A release lever 10 is pivotally connected to the camera housing at 12 and carries a pushbutton 14 at one end and a latch 16 at the other. Latch 16 cooperates with a tab 18 on a generator drive member or sector 20. Drive sector 20 is pivotally mounted on the camera housing at 22 and has a number of gear teeth 24 along an arc whose center of curvature lies at pivot 22. The lower section of the arc is void of teeth. Drive sector 20 is spring biased in a clockwise direction as viewed in FIG. 1 and is held in the position shown in that figure against the force of spring 25 by latch 16 of release lever 10. Gear teeth 24 cooperate with a pinion 26 connected to a movable armature of a generator referred to generally by reference numeral 30.

Drive sector 20 is provided with a tab 32 which is positioned to strike a lug 34 on a pivotally mounted latch 36. Latch 36 is normally biased for rotation in a clockwise direction about a pivot 38 by a spring 40. In the positioned shown in FIG. 1, latch 36 normally holds a shutter drive lever 42 to the left against the bias of a spring 44.

The lens 46 of the camera is provided with a conventional shutter mechanism which carries a projection 50 lying in the path of shutter drive lever 42. The shutter mechanism is pivotally mounted to the camera housing at 52.

A capacitor 54 is connected over the winding of generator 30 and is charged when the armature is rotated by sector 20. The void on sector 20 permits the armature to continue to rotate after sector 20 has reached its end of travel. Of course teeth 24 could extend over the entire length of the sector and the sector be permitted to rotate to a position out of contact with pinion 26. A diode 58 is provided to prevent the capacitor discharge from traveling through the generator winding. A flash attachment having a lamp 60 is connected in parallel with capacitor 54, the electrical connection including a switch 62 in the flash attachment circuit and positioned adjacent lug 34 of latch member 36.

In operation, the above-described portion of the present invention is preset to a condition ready to drive generator 30 by a lever 63 attached to the film advance mechanism or attached to release lever 10. If lever 63 is attached to release lever 10, it is rotated counterclockwise on the upstroke of the release lever. The operation of lever 63 is to be more fully explained with respect to FIG. 3. During the reset operation, generator drive sector 20 is rotated in a counterclockwise direction to tension its biasing spring until tab 18 is engaged by latch 16. Either at the same time or as a separate operation, shutter drive lever 42 is moved to the left against the force of spring 44 and is engaged by latch member 36. At this time the camera is ready for operation.

When pushbutton 14 is depressed, release lever 10 rotates about pivot 12 to remove latch 16 from tab 18. Having been released, generator drive sector 20 rotates rapidly in a clockwise direction about pivot 22 causing pinion 26 to rotate the armature of generator 30. The rotation of the armature builds up an electrical charge across capacitor 54. As drive sector 20 continues to rotate, tab 32 engages lug 34 of latch member 36 and causes the latch member to rotate in a counterclockwise direction. This releases shutter drive lever 42 which is drawn to the right as shown in FIG. 1. As drive lever 42 passes shutter 48, it strikes projection 50 causing the shutter to rotate about pivot 52 to uncover lens 46. Continued movement in a counterclockwise direction of latch member 36 causes lug 34 to contact switch 62, resulting in the closing of the flash attachment circuit to fire bulb 60 by discharging capacitor 54 across the bulb. It is important that drive sector 20 be permitted to continue traveling until its teeth 24 have cleared pinion 26 to permit freewheeling of the armature of the generator 30 and prevent damage caused by excessive deceleration forces.

In order to operate a camera equipped with the above-described device without flash, the present invention may be provided with a photoconductive exposure control unit including a galvanometer 66, a photoconductive cell 68, a resistor 76 and a switch 78 connected in series across capacitor 54. A pair of Zener diodes 70 and 72 are connected across the photoconductive cell and the galvanometer, while a second capacitor 74 is connected across capacitor 54 and switch 78. Switch 78 is provided to selectively open and close the circuit to the photoconductive cell and the galvanometer depending on the operational mode contemplated by the operator. The switch may be normally closed to be opened upon insertion of flashlamp 60.

At the top of FIG. 1, a latch member 80 having a leg portion 82 extending into the path of generator drive sector 20 is pivotally mounted at 84. A slidably mounted sensing member 86 is normally held in the position shown in FIG. 1 by latch member 80 and is biased leftwardly by a spring 88. Sensing member 86 carries a cam surface 90 which cooperates with galvanometer needle 92 of galvanometer 66. The needle is shown separate from galvanometer 66 for purposes of clarity, but it is to be understood that it is in actuality the same element. Sensing member 86 is operatively attached to a conventional camera exposure-setting mechanism, representatively shown.

Figure 2:
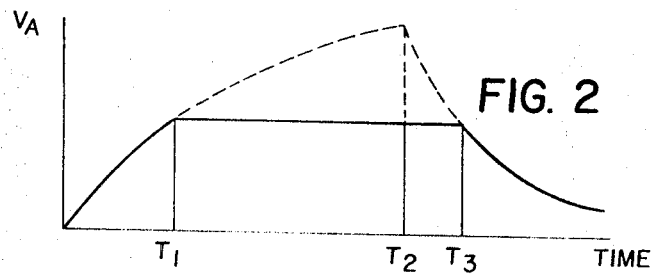
FIG. 2 is a graph showing the operation of the embodiment shown in FIG. 1.

When taking a picture under daylight conditions where it is not desired to use flash, the operator closes switch 78 if it is not of the normally closed type described above and then depresses pushbutton 14 to free sector 20. As sector 20 rotates the armature of the generator 30, the galvanometer needle 92 slowly moves up scale at a rate sufficiently slow to prevent inertia built up in the needle from causing initial over travel beyond its maximum deflection. The rate of needle travel is reduced due to the time required to charge condensers 54 and 74. FIG. 2 shows the rate of voltage $V_A$ built up over photoconductive cell 68 and galvanometer 66. The maximum deflection of needle 92 varies as a function of the resistance of photoconductive cell 68 which is pointed at the scene to be photographed and changes with scene brightness. Voltage $V_A$ in FIG. 2 reaches a constant value at time $T_1$ due to the characteristics of Zener diodes 70 and 72 and remains constant until time $T_3$. That portion of the curve in dotted line shows the voltage built up over capacitor 74, and the point shown as $T_2$ indicates the time at which generator 30 stops charging capacitor 54.

After sector 20 has travelled a part of its total travel and a short time after $T_1$, it engages leg 82 of latch member 80 and releases sensing member 86. Spring 88 moves sensing member 86 leftwardly whereupon it is arrested by contact with needle 92 of galvanometer 66. As can be seen, the amount of travel of sensing member 86 is dependent upon the position of needle 92 which in turn is directly related to the amount of light impinging photocell 68. Thus, the exposure setting of the camera is determined by the position of galvanometer needle 92. After setting the exposure control, sector 20 continues its travel and unlatches shutter drive lever 42 in the manner described above.

Figure 3:
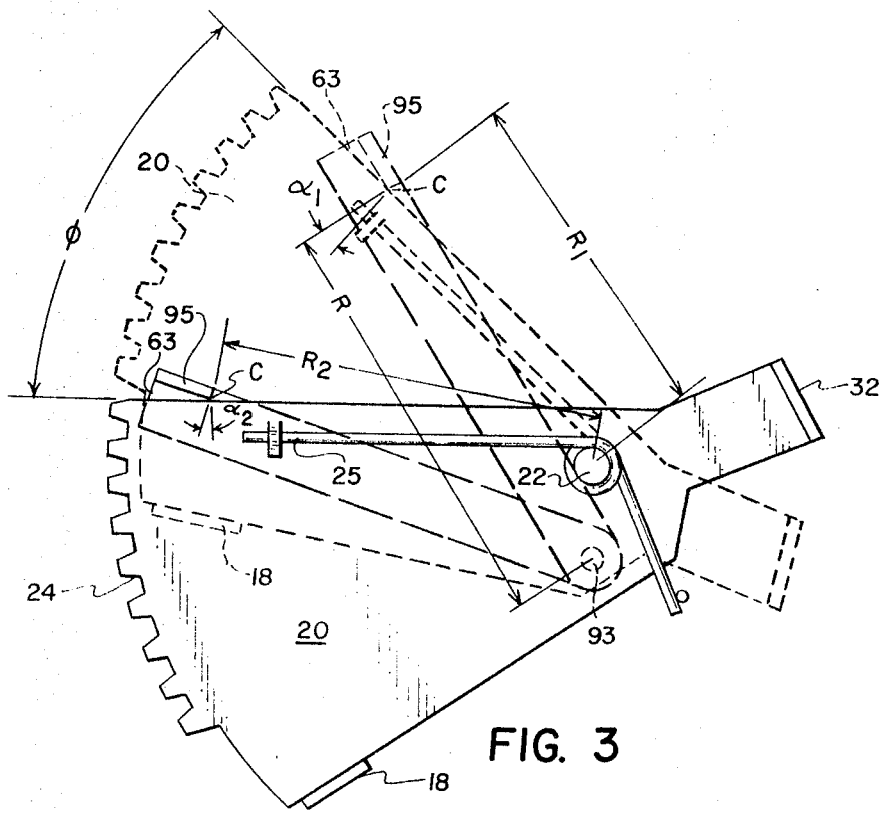
FIG. 3 is an enlarged, segmental view of the embodiment shown in FIG. 1.

FIG. 3 is an enlarged segmental view showing the operation of the reset mechanism embodied in the apparatus of FIG. 1 wherein like structure has been given the same reference numerals. Generator drive sector 20 and reset lever 63 are shown in their "cocked" positions in full line and in their "uncocked" positions in phantom line. Various letters are shown in FIG. 3 for reference in the following explanation.

The torque required to relatch generator drive sector 20 by rotating reset lever 63 is reduced to a minimum by a separate and proper location of their respective pivots. Sector 20 is driven by spring 25 which has a linear torque gradient, its maximum torque occurring when sector 20 is in its latched, full-line position (plus overtravel allowance). By locating pivot 93 of reset lever 63 separately from pivot 22 of drive sector 20, the resetting torque gradient for reset lever 63 can be made to be relatively uniform or even negative by choosing the proper location for its pivot. FIG. 3 shows the relative positions of the pivots in the two extreme conditions. In the unlatched, phantom line position, the torque of generator drive sector 20 is $KA$, where:

$K =$ Torque gradient for spring 25 in (in. oz.)/degree,
$A =$ Deflection of spring 25 from zero torque in degrees The torque requirement $T_1$ of reset lever 63 at the position shown in phantom at impending motion is:

$$T_1 = \frac{KAR}{R_1 \cos \delta_1}$$

$R_1 =$ Radius on sector 20 at which Point "C" of lug 95 contacts sector 20 in inches,
$R =$ Radius on reset lever 63 of Point "C" on lug 95 in inches,
$\gamma =$ Angle between applied force from lever 63 and resulting force on sector 20 in degrees.

The torque requirement $T_2$ for reset lever 63 at the position shown in full lines is:

$$T_2 = \frac{K(A+\phi)R}{R_2 \cos \delta_2}$$

where
$\Phi =$ Angle through which sector 20 rotates from its full line to phantom line positions in degrees For the condition where $\gamma_1 \cong \gamma_2$, $T_2$ may be made equal to, greater than, or less than, $T_1$ by the relative values of $R_1$, $R_2$, $A+\Phi$. The optimum condition in this application would be for $T_2$ to equal $T_1$. $R_1$ and $R_2$ would then be related in the following manner:
where $T_2 = T_1$, $$\frac{K(A+\phi)R}{R_2 \cos \delta_2} = \frac{KAR}{R_1 \cos \delta_1}$$

$$R_2 = R_1 \left(\frac{A+\phi}{A}\right) \frac{\cos \delta_1}{\cos \delta_2}$$

$$R_2 = R_1 \left(\frac{A+\phi}{A}\right)$$

By choosing the location of the pivots for reset lever 63 and drive sector 20 properly, the above relationship may be established for any value of $A$ or $\Phi$. Thus, in this condition, the torque requirement for lever 63 would be essentially constant for setting sector 20.

In the embodiment shown in FIG. 4, the voltage-generating device described in conjunction with FIG. 1 is used to charge a rechargeable battery instead of a condenser. Like reference numbers have been used in FIG. 3 for structure corresponding to those reference numbers as used in FIG. 1.

A rechargeable battery 81 is connected through diode 58 across generator 30. Battery 81 is intended to operate any system in the camera which would require electrical energy such as exposure control devices or flashlamps. Lamp 60 and shutter operated switch 62 are connected across battery 81 so that the power stored in the battery is used to fire flashlamp 60 when switch 62 is closed.

Each time a picture is taken, generator drive sector 20 is released to power generator 30 and place a charge on battery 81. To prevent overcharging battery 81 when daylight pictures are taken, I have provided a switch 83 which closes when flashlamp 60 is removed to place a resistor 85 into the flashing circuit.

To put an initial charge on battery 81 or to recharge the battery after long periods of nonuse, I have provided a second generator 87 and diode 89 across the battery. Generator 87 may be driven by the motor-winding mechanism 91 shown in my commonly assigned U.S. Pat. No. 3,186,322 of June 1, 1965. Thus, each time a film cartridge is loaded into such a camera and the spring motor is wound, generator 87 would place an initial charge on battery 81. Alternatively, generator 87 could be omitted and battery 81 initially charged through a suitable electrical circuit, not shown, to an ordinary household current.

As with the embodiment of FIG. 1, the embodiment shown in FIG. 4 may be provided with an exposure control system for daylight use, and such a system has been shown.

In the embodiment shown in FIG. 5, a shutter release lever 94 is pivotally mounted at 96 and carries a latch 98 which cooperates with a tab 100 on a drive lever 102. Drive lever 102 is biased for counterclockwise rotation about pivot 103 by a spring 104 and carries a cam 106 and an arm 108. Cam 106 is positioned adjacent a pivotally mounted lens opening lever 110 having a protrusion 112 cooperating with cam 106. Arm 108 lies adjacent a generator drive sector 114 which is biased in a counterclockwise direction about pivot 116 by a spring 118. Drive sector 114 and its associated generator are similar in construction to that shown in the embodiment of FIG. 1.

In operation, release lever 94 is manually depressed to unlatch drive lever 102 for counterclockwise rotation. As drive lever 102 moves, cam 106 depresses protrusion 112 to open shutter blades 120. Simultaneously, arm 108 rotates drive sector 114, this motion in turn driving the generator armature. Drive lever 102 ceases to rotate when it strikes a tab 121 on lever 110. The circuitry for firing the flash or setting the exposure is similar to that shown in FIG. 1 and will not be set forth in detail. After the shutter blades are opened, electrical switch 122 closes to fire the flash. It is to be understood that the exposure control system for daylight photography shown in FIG. 1 can also be used in conjunction with a camera equipped with the device shown in FIG. 5. Further, like in FIG. 4, the reset mechanism shown in FIG. 1 can be used in the embodiment of FIG. 5.

The invention has been described in detail with particular reference to preferred embodiments thereof, but it will be understood that variations and modifications can be effected within the spirit and scope of the invention.

I claim:
1. For use in a camera, an exposure control apparatus comprising:
   an exposure setting mechanism adjustable for establishing an exposure parameter;
   an electrically energizable exposure control circuit having photoresponsive means with an output member positionable in accordance with scene illumination;
   sensing means movable into engagement with said output member for sensing the position of said output member and for adjusting said exposure-setting mechanism in accordance with the sensed position of said output member;
   an electric generator for energizing said exposure control circuit;
   means movable along a path between first and second positions for driving said generator; and
   means for controlling said movement of said sensing means into engagement with said output member, said controlling means being actuable in response to movement of said generator-driving means to said second position to effect the adjustment of said exposure-setting mechanism by said sensing means.

2. Apparatus according to claim 1 wherein said sensing means includes a cam surface engageable with said output member for adjusting said exposure-setting mechanism.

3. The invention according to claim 1 wherein said apparatus further comprises capacitor means electrically connected to said generator and chargeable in response to the driving of said generator energizing said exposure control circuit.

4. The invention according to claim 1 wherein:
   said sensing means is biased toward engagement with said output member for sensing the position of said output member and for adjusting said exposure-setting mechanism; and
   said controlling means comprises means for releasably holding said sensing means out of engagement with said output member, said releasable holding means being actuable in response to movement of said generator-driving means to said second position to release said sensing means for engagement with said output member.